April 12, 1960 N. GÜNTHER 2,932,234
STEREOSCOPIC RANGE FINDERS
Filed Feb. 27, 1957

United States Patent Office 2,932,234
Patented Apr. 12, 1960

2,932,234

STEREOSCOPIC RANGE FINDERS

Norbert Günther, Aalen, Wurttemberg, Germany, assignor to Carl Zeiss, Heidenheim (Brenz), Wurttemberg, Germany Application February 27, 1957, Serial No. 642,803

Claims priority, application Germany March 2, 1956

6 Claims. (Cl. 88—2.7)

The invention relates to stereoscopic range finders with oculars whose lateral distance between each other is adjustable. In devices of this type the viewer will see a plastic or so-called three dimensional image of the target area and the measuring marks. In order to eliminate between the mark image and the target image a residual parallax which would make the result of the measurement incorrect it is necessary that the lateral distance between the oculars of the range finder be the same as the distance between the eyes of the viewer. This is of particular importance when relatively short distances are to be measured, because the shorter the distance is which is to be measured the greater will be the measuring error when the distance between the oculars does not correspond with distance between the eyes of the viewer. In such devices the customary adjustability by means of an eye distance scale is no longer sufficiently accurate, because such an adjustment is too coarse and furthermore in many cases the viewer does not know the correct distance between his eyes.

The object of the invention is to overcome the disadvantages of such types of range finders in which the oculars are arbitrarily adjusted by means of a scale. According to the present invention optically produced means are employed for an absolutely correct adjustment of the oculars.

It is an object of the invention to provide each one of the two telescopes in a stereoscopic range finder with at least two adjacent but in depth slightly offset measuring marks. The viewer will then see not a plastic image of the measuring mark as heretofore, but he will see at least two images. These two images of the mark appear offset in depth when the oculars are adjusted to a wrong lateral distance between each other. If, however, the oculars are adjusted to the correct lateral distance the viewer will see two image marks arranged adjacent each other in a single plane. Therefore, the viewer will adjust the distance between the oculars until the two image marks appear to lie one adjacent the other.

Another object of the invention is to provide three measuring marks in each telescope of a stereoscopic range finder. The measuring marks are arranged in a single row and the two outer ones are arranged symmetrically with respect to the center one which preferably is disposed in the optical axis. When adjusting the oculars the image of the center mark appears to travel relatively to the images of the outer marks and there is obtained a very pleasant adjustment of the distance between the oculars. Preferably there is provided in each telescope a glass plate on which the measuring marks are arranged. The two outer marks are arranged on one side of the glass plate and the center mark on the other side thereof. Since only one mark is used for the measurement proper, this particular mark is given a shape or form distinguishing it clearly from the other two marks. The center mark may have, for instance, a triangular shape while the other two outer marks may have a rectangular shape.

With these and other objects in view an example of the stereoscopic range finder of the invention will now be described in the following description with reference to the accompanying drawing in which.

Figure 1:
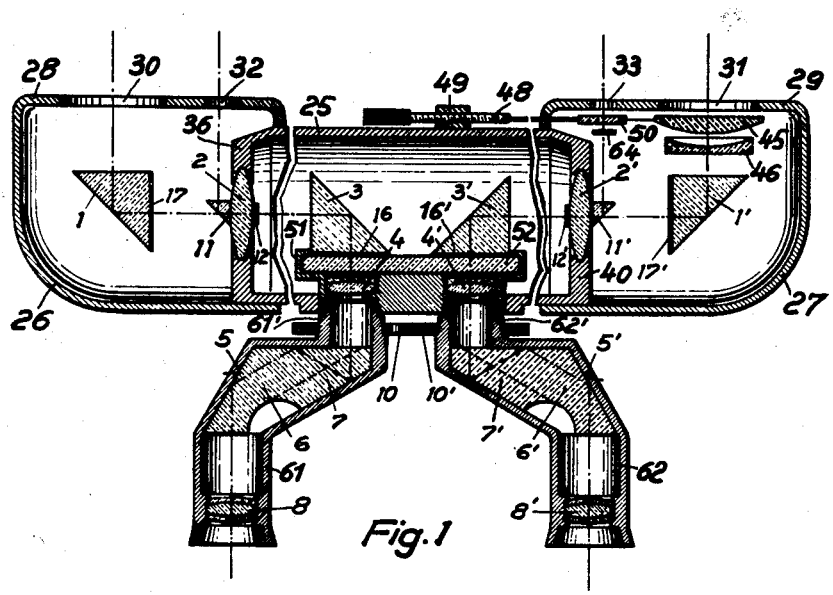
Fig. 1 is a horizontal sectional view of a stereoscopic range finder.

Referring to Fig. 1 of the drawing, the stereoscopic range finder is provided with a longitudinal or tubular main housing 25 to both ends of which are attached the end housings 26 and 27, respectively. The latter are each provided with a forwardly facing wall 28 and 29, respectively, having each arranged therein a large light admitting opening 30 and 31, respectively, and a small light admitting opening 32 and 33, respectively. The end housing 26 has mounted therein a triangular glass prism 1 and the other end housing 27 is similarly equipped with a triangular glass prism 1'.

The left hand end wall 36 of the main housing 25 has mounted therein a lens 2, the front face of which has cemented thereto a small prism 11. The prism 11 is arranged in the path of light entering the small opening 32 while the prism 1 is arranged in the path of the light entering the large opening 30 and is adapted to deflect the incoming light rays toward and through the lens 2.

The right hand end wall 40 of the main housing 25 has mounted therein a lens 2', the front face of which has cemented thereto a small prism 11'. The prism 11' is arranged in the path of light entering the small opening 33 while the light entering the large opening 31 is reflected by the prism 1' toward and through the lens 2'. Between the large opening 31 and the prism 1' is arranged a pair of lenses 45 and 46 which normally constitute a plane parallel glass plate. The lens 46 is plano-concave and is mounted stationary, while the other lens 45 is plano-convex and is arranged to be adjustable at right angles to the optical axis by means of a manually operable screw spindle 48 mounted in a threaded bearing block 49 on the outside of the main housing 25. The same screw spindle 48 operates at the same time a transparent scale plate 50 which is arranged in the rear of the small opening 33 and is fixedly connected with the lens 45 or rather its mount which is not shown in the diagrammatic illustration of these parts. When the lens 45 is laterally adjusted the plane parallel glass plate formed normally by the lenses 45, 46 is changed to an optical wedge which deflects the target ray about a parallactic angle. At the same time the scale plate 50 is moved relatively to a fixed transparent index plate 64 arranged between the plate 50 and the prism 11'.

The main housing 25 has mounted in its central portion in a mount 51, a glass plate 52 on one side of which are cemented two triangular prisms 3 and 3'. The bases of the prisms 3 and 3' resting on the glass plate 52 are provided with a partly transparent mirror layer 16 and 16', respectively. The rays entering the main housing 25 through the lenses 2 and 2' are reflected by the eyepiece prisms 3 and 3', respectively, rearwardly into the cemented lenses 4 and 4', respectively, of positive diameter which are also secured in the mount 51. The negative members of the cemented lenses 4 and 4' may be considered as oculars or eyepieces of Galilean telescopes, the objectives of which are formed by the lenses 2 and 2', respectively, while the positive members of the lenses 4 and 4' forming the objectives of Kepler telescopes for which the eyepieces or oculars are formed by the lenses 8 and 8' arranged in the tubular mounts 61, 62. The latter are attached to the fixed mount 51 so as to be rotatably adjustable about the optical axes of the cemented lenses 4 and 4', respectively.

In the path of the rays of the Kepler telescopes are arranged within an enlargement of the tubular mounts 61 and 62 the deflecting prisms 5 and 5', respectively, each having a roof edge. These prisms have the purpose of producing upwardly standing images at all times, regardless of the rotative adjustment of the tubular mounts 61, 62 about their axis of rotation. These Kepler telescopes permit a greater enlargement than is possible with Galilean telescopes alone. The front ends 61' and 62' of the tubular mounts 61 and 62 which are rotatably mounted in the stationary mount 51 are provided with gears 10 and 10' of the same diameter which mesh with each other, so that both tubular mounts 61 and 62 are always simultaneously rotatably adjusted about the same angular distance. This is done for the purpose of adjusting the oculars 8 and 8' to the correct distance between the eyes of the user of the range finder.

The partly transparent mirrors 16 and 16' are arranged at a location which is spaced from the lenses 2 and 2', respectively, rearwardly a distance equal to one-half of the focal length of the lenses 2 and 2'. The mirrors 17 and 17' on the prisms 1 and 1' which face the lenses 2 and 2', respectively, are also partly transparent.

The rays coming from the target enter first the large openings 30 and 31 and pass through the triangular prisms 1 and 1', respectively; are deflected by the latter and pass through the lenses 2 and 2', respectively, and then are deflected by the triangular prisms 3 and 3', respectively, into the cemented lenses 4 and 4', respectively. The rays or images of the target are then reflected by the roof prisms 5 and 5', respectively, into the oculars 8 and 8', respectively.

The prisms 11 and 11' which are cemented to the outer faces of the lenses 2 and 2', respectively, are employed for illuminating of measuring mark plates 12 and 12' cemented to the rear faces of the lenses 2 and 2', respectively.

Figures 2, 3:
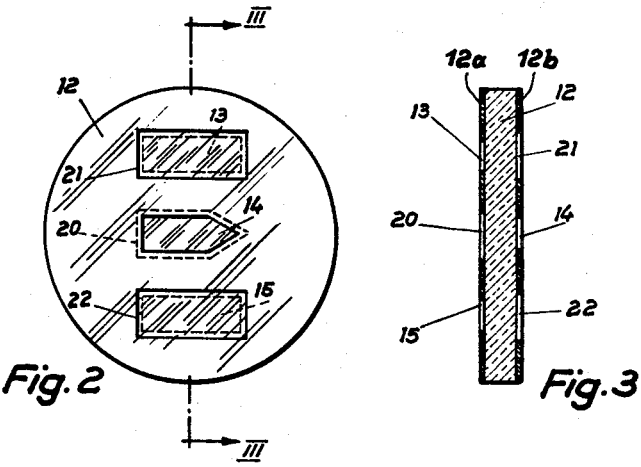
Fig. 2 is an elevational view of one of the two measuring mark plates.
Fig. 3 is a sectional view of the measuring mark plate along the line III—III of Fig. 2.

Referring now to the Figs. 2 and 3 it will be noted that the measuring mark plate 12 is provided on both sides with a layer of silver 12a and 12b, respectively, and there are provided three marks 13, 14 and 15 formed by erasures in the silver layers 12a and 12b. The two outer marks 13 and 15 are formed in the layer 12a and the center mark 14 is formed in the layer 12b. For illuminating the mark 14 the silver layer 12a on the outer side of the plate 12 is provided with window 20 which is somewhat larger than the size of the mark 14. In order to permit an observation of the marks 13 and 15 the silver layer 12b is provided with windows 21 and 22, respectively, which are larger than the size of the marks 13 and 15, respectively.

The other lens 2' is provided with a similarly constructed measuring mark plate 12' having exactly the same arrangement of three marks and three windows as the measuring mark plate 12.

The marks 14 are used as the measuring marks proper and are arranged in the rear focal points of the lenses 2 and 2', respectively. The mirrors 16 and 16' reflect the light beams from these marks and these light beams are projected by the lenses 2 and 2' into infinity of the object space. The mirrors 17 and 17' reflect the light beams from the measuring marks again so that the same together with the light beams coming from the target are directed into the eyes of the observer looking into the oculars 8 and 8'.

Since each of the measuring mark plates 12 and 12' is provided with three marks 13, 14 and 15 the viewer will see three plastic images of the marks in the shape as shown in Fig. 2. Since the marks are offset with respect to each other in depth their stereoscopic images appear non-uniformly spaced from the viewer when the lateral distance between the oculars 8 and 8' is not the same as the distance between the eyes of the viewer. If, however, the viewer rotates the oculars 8 and 8' to adjust the distance between the same to be equal to the distance between the eyes of the viewer then the images of the two outer marks travel relatively to the stereoscopic image of the marks 14 on the plates 12 and 12'. As soon as all three images of the marks appear to be positioned in a single plane the distance between the oculars 8 and 8' is correctly adjusted to the distance which exists between the eyes of the viewer.

What I claim is:

1. In a stereoscopic range finder, a longitudinal housing, axially spaced lenses in the end portions of said housing, each of said lenses forming the objective of a telescope, an ocular for each one of said telescopes, said oculars being arranged in the central portion of said longitudinal housing and having their optical axes arranged at right angles to the optical axis of said axially spaced lenses, an ocular prism arranged between each said lenses and each said oculars, partly transparent mirrors arranged perpendicular to the optical axes of said oculars in said housing at points halving the focal length of said lenses and between said ocular prisms and said oculars, a reflecting means in front of each said objectives of the telescopes formed by said axially spaced lenses for directing the rays coming from the target through said lenses and toward said partly transparent mirrors, means for attaching said oculars to said housing in such a manner that the same are adjustable at right angles to their optical axis, means for adjusting said oculars to vary the lateral distance between the same, at least two measuring marks having the same shape and size disposed in axially spaced relation on the central portion of each of said lenses, one of said marks touching one face of said lenses, said marks covering only a small portion of the area of said lenses, and a semi-transparent mirror arranged perpendicularly to the optical axis on said reflecting means for projecting images of said measuring marks back to said lenses and into the path of the rays coming from the target so that said images of said marks and the image of the target are viewed by said oculars at the same time.

2. In a stereoscopic range finder, a longitudinal housing, axially spaced lenses in the end portions of said housing, each of said lenses forming the objective of a telescope, an ocular for each one of said telescopes, said oculars being arranged in the central portion of said longitudinal housing and having their optical axes arranged at right angles to the optical axis of said axially spaced lenses, an ocular prism arranged between each said lenses and each said oculars, partly transparent mirrors arranged perpendicular to the optical axes of said oculars in said housing at points halving the focal length of said lenses and between said ocular prisms and said oculars, a reflecting means in front of each said objectives of the telescopes formed by said axially spaced lenses for directing the rays coming from the target through said lenses and toward said partly transparent mirrors, means for attaching said oculars to said housing in such a manner that the same are adjustable at right angles to their optical axis, means for adjusting said oculars to vary the lateral distance between the same, at least two measuring marks having the same shape and size disposed in axially spaced relation on the central portion of each of said lenses, one of said marks touching one face of said lenses, said marks covering only a small portion of the area of said lenses, and means arranged perpendicularly to the optical axis for projecting images of said measuring marks back to said lenses and into the path of the rays coming from the target so that said images of said marks and the image of the target appear on said partly transparent mirrors to be viewed by said oculars at the same time.

3. In a stereoscopic range finder, a longitudinal housing, axially spaced lenses in the end portions of said housing, each of said lenses forming the objective of a telescope, an ocular for each one of said telescopes, said oculars being arranged in the central portion of said longitudinal housing and having their optical axes arranged at right angles to the optical axis of said axially spaced lenses, an ocular prism arranged between each said lenses and each said oculars, partly transparent mirrors arranged perpendicular to the optical axis of said oculars in said housing at points halving the focal length of said lenses, and between said ocular prisms and said oculars, a reflecting prism in front of each said objectives of the telescopes formed by said axially spaced lenses for directing the rays coming from the target through said lenses and toward said partly transparent mirrors, means for attaching said oculars to said housing in such a manner that the same are adjustable at right angles to their optical axis, means for adjusting said oculars to vary the lateral distance between the same, a glass plate provided with three separate measuring marks disposed on one face of each said lenses and perpendicular to the optical axes of the same, the marks on both of said glass plates having the same shape and size and lateral distance from each other, said plate covering only a small area of said lenses, said three marks being arranged in a single row thereon in spaced relation from each other, the center one of said marks being arranged on one side of said plate and the other outer marks being arranged on the other side of said plate symmetrically with respect to said center mark, and a partly transparent mirror on one face of each of said reflecting prisms which face is perpendicular to the optical axes of said lenses for projecting images of said measuring marks back to said lenses and into the path of rays coming from the target so that the images of said measuring marks are viewed by said oculars together with the image of the target.

4. In a stereoscopic range finder, a longitudinal housing, axially spaced lenses in the end portions of said housing, each of said lenses forming the objective of a telescope, an ocular for each one of said telescopes, said oculars being arranged in the central portion of said longitudinal housing and having their optical axes arranged at right angles to the optical axis of said axially spaced lenses, an ocular prism arranged between each said lenses and each said oculars, partly transparent mirrors arranged perpendicular to the optical axes of said oculars in said housing at points halving the focal length of said lenses, and between said ocular prisms and said oculars, a reflecting means in front of each said objectives of the telescopes formed by said axially spaced lenses for directing the rays coming from the target through said lenses and toward said partly transparent mirrors, means for attaching said oculars to said housing in such a manner that the same are adjustable at right angles to their optical axis, means for adjusting said oculars to vary the lateral distance between the same, means forming three separate measuring marks disposed in a single row in spaced relation in the central area on one face of each said lenses and perpendicular to the optical axes of the same, the marks on both of said lens faces being of identical shape and size and arrangement, the center one of said marks having a different shape as the other two marks which latter have the same shape and being arranged offset the same distance in the direction of the optical axes of said lenses with respect to the two outer ones which are arranged symmetrically to said center mark, and a second partly transparent mirror arranged perpendicularly to the optical axis of each of said lenses and on each of said reflecting means in front of each of said lenses for projecting images of said measuring marks back to said lenses and into the path of rays coming from the target and onto said first mentioned partly transparent mirrors so that measuring marks are viewed by said oculars together with the image of the target which also appears on said partly transparent mirrors.

5. In a stereoscopic range finder, a longitudinal housing, axially spaced lenses in the end portions of said housing, each of said lenses forming the objective of a telescope, an ocular for each one of said telescopes, said oculars being arranged in the central portion of said longitudinal housing and having their optical axes arranged at right angles to the optical axis of said axially spaced lenses, an ocular prism arranged between each said lenses and each said oculars, partly transparent mirrors arranged perpendicular to the optical axes of said oculars in said housing at points halving the focal length of said lenses and between said ocular prisms and said oculars, a reflecting prism in front of each said objectives of the telescopes formed by said axially spaced lenses for directing the rays coming from the target through said lenses and toward said partly transparent mirrors, said oculars comprising a stationary mount attached to said housing between the ends thereof and two optical means forming the eyepiece of Gallilean telescopes arranged closely adjacent each other in said mount, two tubular mounts with laterally offset portions rotatably secured to said stationary mount so as to be rotatable respectively about the optical axes of said optical means, means for simultaneously rotating said tubular mounts to vary the lateral distance between said offset portions, and ocular lenses in the offset portion of said tubular mounts for viewing the images appearing in said Galilean telescopes, means forming three separate measuring marks disposed in a single row in spaced relation in the central area on one face of each said lenses and perpendicular to the optical axes of the same, the marks on both of said lens faces being of identical shape and size and arrangement, the center one of said marks having a different shape as the other two marks which latter have the same shape and being arranged offset the same distance in the direction of the optical axes of said lenses with respect to the two outer ones which are arranged symmetrically to said center mark, and means on said reflecting prisms and arranged perpendicularly to the optical axis for projecting said measuring marks into the path of rays coming from the target and onto said partly transparent mirrors so that said measuring marks are viewed by said oculars together with the image of the target which also appears on said partly transparent mirrors.

6. In a stereoscopic range finder, a longitudinal housing, axially spaced lenses in the end portions of said housing, each of said lenses forming the objective of a telescope, an ocular for each one of said telescopes, said oculars being arranged in the central portion of said longitudinal housing and having their optical axes arranged at right angles to the optical axis of said axially spaced lenses, an ocular prism arranged between each said lenses and each said oculars, partly transparent mirrors arranged perpendicular to the optical axes of said oculars in the central portion of said housing at points halving the focal length of said lenses and between said ocular prisms and said oculars, a reflecting prism in front of each said objectives of the telescopes formed by said axially spaced lenses for directing the rays coming from the target through said lenses and toward said partly transparent mirrors, means for ataching said oculars to the central portion of said housing in such a manner that the same are adjustable at right angles to their optical axis, means for adjusting said oculars to vary the lateral distance between the same, a glass plate provided with three separate measuring marks disposed on one face of each said lenses and perpendicular to the axes of the same, said plate covering only a small area of said lenses, the marks on both of said glass plates having the same shape and size and lateral distance from each other, said three marks being arranged in a single row thereon in spaced relation from each other, the center one of said marks being arranged on one side of said plate and the other outer marks being arranged on the other side of said plate symmetrically with respect to said center mark, and a partly transparent mirror on one face of each of said reflecting prisms which face is perpendicular to the optical axes of said lenses for projecting images of said measuring marks back into said lenses and into the path of rays coming from the target and onto said first mentioned partly transparent mirrors so that the images of said measuring marks appear in the central portion of the images of the target when viewed by said oculars, said images upon adjustment of said oculars to the distance between the viewer's eyes will appear to be positioned in a single plane.

References Cited in the file of this patent

UNITED STATES PATENTS

| | | |
|---|---|---|
| 1,000,609 | Konig | Aug. 15, 1911 |
| 1,085,612 | Jacob | Feb. 3, 1914 |
| 2,144,257 | Eppenstein | Jan. 17, 1939 |
| 2,401,695 | MacNeille | June 4, 1946 |